United States Patent [19]
Keating

[11] 3,818,432

[45] June 18, 1974

[54] AUTOMOBILE WARNING-BUZZER SUPPRESSOR

[76] Inventor: Edward Keating, 17517 Catalina Ave., Gardena, Calif. 90248

[22] Filed: June 26, 1973

[21] Appl. No.: 373,676

[52] U.S. Cl. ............................ 340/52 D, 307/10 R
[51] Int. Cl. ............................................ B60q 5/00
[58] Field of Search ................ 340/52 D; 307/10 R

[56] References Cited
UNITED STATES PATENTS

| | | | |
|---|---|---|---|
| 3,072,884 | 1/1963 | Hughes | 340/52 D |
| 3,077,576 | 2/1963 | Hughes | 340/52 D |
| 3,138,780 | 6/1964 | Jacobsen | 340/52 D |
| 3,256,461 | 6/1966 | Foreman et al. | 340/52 D |
| 3,646,511 | 2/1972 | Holt | 340/52 D |

*Primary Examiner*—Alvin H. Waring
*Attorney, Agent, or Firm*—Howard I. Podell

[57] ABSTRACT

A device that surpresses the warning buzzer circuit of an automobile and maintains warning circuit in the off condition by means of a solenoid until the driver's door opens or until all other doors are closed, at which time the buzzer circuit returns to its normal state.

The invention employs electronic means to hold the circuit open.

1 Claim, 3 Drawing Figures

PATENTED JUN 18 1974  3,818,432

AUTOMOBILE WARNING-BUZZER SUPPRESSOR

SUMMARY OF THE INVENTION

This invention relates to an electrical means of voluntarily suppressing the warning buzzer of an automobile when a passenger car door of the vehicle is to be opened while the engine is running.

The advantage of this invention is that when a driver or passenger of an automobile opens one of the passenger doors, he does not necessarily have to hear the annoying sound of the warning buzzer.

A further advantage of this invention is that the warning-buzzer circuit is automatically reset when all passenger doors have been closed or when the driver's door opens, thus preserving the safety feature of the warning-buzzer, which is to prevent the driver from leaving the vehicle while the key is in the ignition switch lock.

The invention comprises a solenoid suppressor switch which is activated by depressing a suppressor switch button. When thus activated, the solenoid maintains the suppressor switch in the closed position and opens the circuit of the warning buzzer so that buzzer is inoperative until the solenoid is deactivated by the closing of all passenger doors of the vehicle or by the opening of the driver's door.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
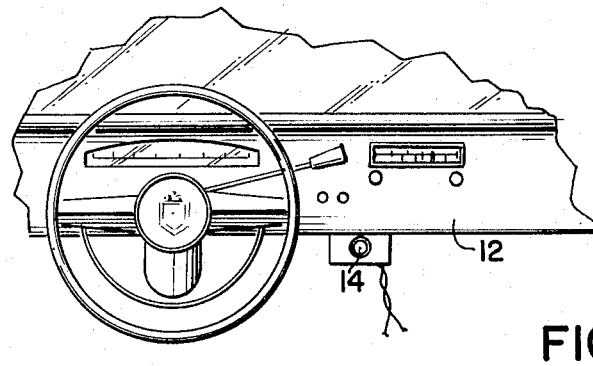
FIG. 1 is a front view of the dashboard of a vehicle with the switch of the Automobile Warning-buzzer Suppressor circuit attached.
Figure 2:
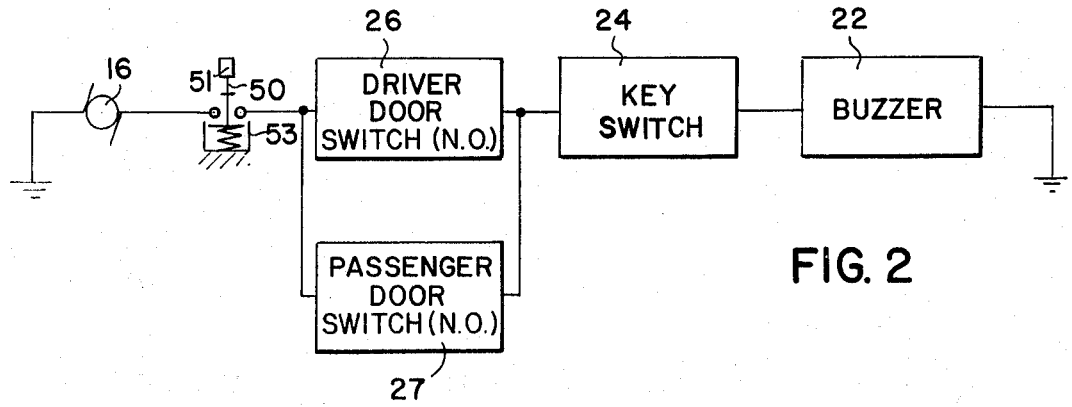
FIG. 2 is a schematic diagram of an alternate suppressor circuit.

Turning now descriptively to the drawings, in which similar reference characters denote similar elements throughout the several views, FIG. 1 illustrates a vehicle dashboard 12 on which is mounted the switch 14 for activating the Automobile Warning-Buzzer Suppressor circuit.

Figure 3:
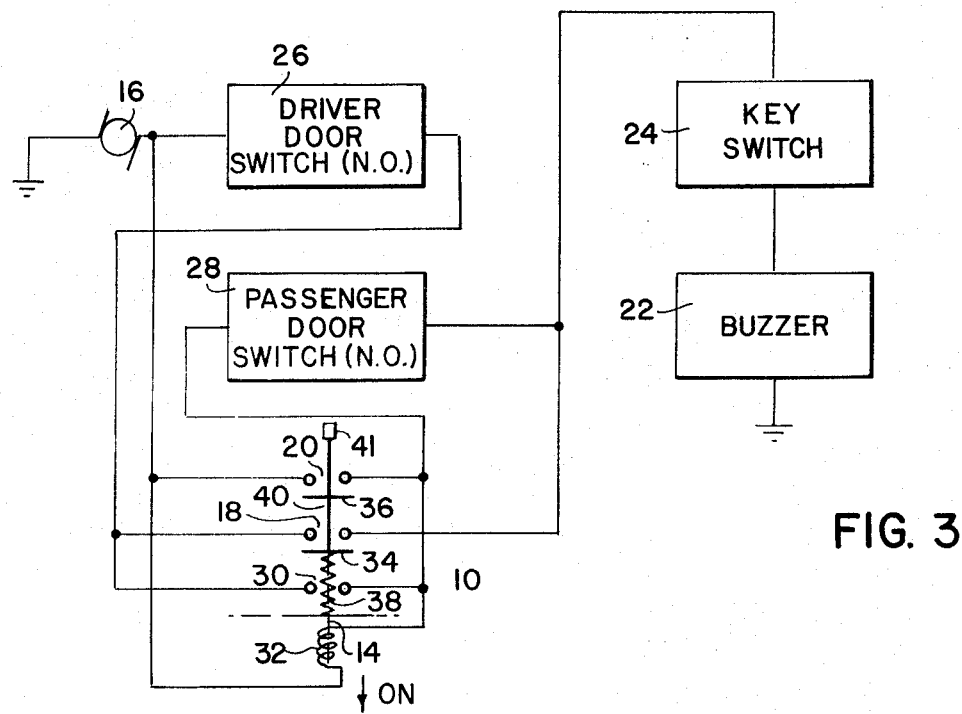
FIG. 3 is a schematic diagram of the preferred embodiment of the Warning-Buzzer Suppressor circuit.

FIG. 3 depicts the Automobile Warning-Buzzer Suppressor circuit 10 which is attached to a power source 16. As shown in FIG. 3, the switch arm 14 of the suppressor solenoid switch 40 is midway between its normal full off position or the on position of the switch. When the switch 14 is in the normally off position, compression spring 38, about switch arm 14 maintains switches 18 and 20 in the closed position by contacts 34 and 36 respectively, with switch contacts 30 left open. Switch 20, when closed, completes the conventional circuit through the normally open passenger door switch 28, which activates the buzzer 22, when the ignition key switch 24 is activated and when a passenger door is open. Switch 18 completes the conventional circuit through the normally open driver door switch 26 which activates the buzzer 22 when the ignition key switch 24 is activated and when the driver door is open.

If the switch arm 14 is manually turned on by manual axial pressure on switch button 41 and a passenger door is then opened, the solenoid coil 32 is energized by the closing of switch 28 and the solenoid coil retains switch arm 14 in its energized position. When switch arm 14 is in the energized position, switch contacts 30 are maintained in the closed position by contact 34, switch contacts 18 remain open because switch contact 36 is designed so as to close only contacts 20 and switch contacts 20 are maintained in the open position. When switch arm 14 is in the energized position, the current that passes through the solenoid coil 32, the passenger door switches 28, the key switch 24, and the buzzer 22 is sufficient to maintain switch 14 in the energized position by the action of the solenoid coil 32, but the current is insufficient to sound the buzzer 22. Hence, when the switch 14 is in the energized position, and when a passenger door is open, the buzzer 22 does not sound. Once the passenger doors are closed and passenger door switch 28 returns to the normally open position, the passenger door switch 28 opens the circuit to the solenoid coil 32, and the switch arm 14 returns to its full off position.

However, when the switch arm 14 is in the energized position with solenoid coil 32 energized, the driver door is opened, closing the contacts of driver door switch 26, current shunts through switch contacts 30 to fully activate the buzzer, and to disconnect solenoid coil 32 from the circuit. Solenoid coil 32 is designed so that the magnetic flux generated when coil 32 is energized is insufficient to move switch arm 14 from the normally off position, but such flux is sufficient to retain switch arm 14 in the energized position after the switch arm button 41 has been manually depressed, with coil 32 energized.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by letters Patent of the United States is:

1. A device for permitting the driver of a vehicle to temporarily suppress the warning-buzzer that normally indicates that the ignition key is in the ignition lock and that a door of the vehicle is in the open position, said device acting to suppress the warning-buzzer after a switch has been manually depressed and a passenger door of the vehicle has been open with the device maintaining suppression of the warning-buzzer circuit until all passenger doors have been closed when the device returns the warning-buzzer circuit to its normal mode of operation, said device acting to sound the warning-buzzer at all times should the driver door of the vehicle become open, said device comprising a manually operated switch and solenoid assembly that is connected to the passenger door switch and the driver door switch and through the ignition switch to the buzzer, said solenoid switch assembly including a switch arm which terminates at one end outside of the switch assembly in a switch button, said switch arm being held in the normally off position by means of a compression spring, with pressure on the switch button against the force of the compression spring acting to move the switch arm so as to close one set of contacts in the switch and a solenoid coil mounted so as to retain the switch arm in the fully on position when said solenoid coil is energized, said solenoid coil being of too weak a nature to move the switch arm from the normally off position to the on position unless manual pressure is applied to the switch button, said solenoid switch assembly having one pair of switch contacts in the normally closed position which is joined in series between the power source and one terminal of the normally open passenger door switch and one set of switch contacts in the normally closed position which are joined in series between the normally open driver door switch and the circuit of the warning-buzzer, with the coil of said solenoid switch assembly joined in parallel with the normally closed switch contacts of the assembly which are in series with the passenger door switch.

* * * * *